Jan. 17, 1967   W. D. McCOY   3,298,621

FILAMENT WINDING APPARATUS

Filed May 7, 1965

INVENTOR
WILLIAM D. McCOY
BY
Howard J. Barnett
ATTORNEY

3,298,621
FILAMENT WINDING APPARATUS
William D. McCoy, 15145 Leland Drive,
Brookfield, Wis. 53005
Filed May 7, 1965, Ser. No. 454,069
5 Claims. (Cl. 242—18)

This invention relates to a method and apparatus for continuously winding a strand and is a continuation-in-part application of my co-pending application, Serial No. 226,132, filed September 25, 1962, now abandoned.

In the high speed manufacture of glass filaments and strands where molten glass is drawn in attenuated form from a glass drawing bushing, it is extremely important that the glass be drawn continuously from the bushing. In order to maintain cross-sectional uniformity of the filament being drawn from the bushing, the glass must be drawn continuously and at a relatively uniform speed. As the drawing speed of the glass slows to a point below optimum operational speeds, the cross-section of the filament increases in size and gradually becomes uncontrollable. Eventually glass droplets develop at the bushing orifices and the drawing operation is halted. When, however, the drawing speed increases to a point beyond the optimum speed, the filament tends to become too greatly attenuated and eventually parts as its cross-section and tensile strength is gradually reduced.

The apparatus of the invention acts to wind such a filament upon a drum simultaneously with its being drawn from a bushing. The filament is usually wound upon the drum at a relatively uniform high speed. When the amount of glass desired has been wound upon the drum, the drum is rotated out of the normal winding position, although glass is still being wound upon the drum. A second empty drum which is rotating at optimum winding speed is gradually shifted into the normal winding position formerly occupied by the first drum and an arm acts to deflect the filament, which is still being wound at optimum winding speed upon the first drum, into a circumferential slot or crevice provided on the periphery of the second drum. This slot acts in conjunction with the arm to catch or grip the deflected filament and to hold it therein momentarily as the filament commences winding upon the second drum. The arm is disengaged from contact with the filament which is then permitted to move in a direction axially away from the slot and to resume its normal winding angle with respect to the axis of the drum. Winding of the filament upon the second drum continues until the desired quantity has been wound upon the drum.

The shifting of the drums and transfer of the strand or filamentary material from the filled drum to the empty drum may be accomplished substantially without alteration of the delivery speed of material to the drums. This is particularly advantageous in the drawing of filaments from a bushing as cross-sectional variations of the filament can be avoided by maintaining a uniform and continuous drawing speed.

Various objects and advantages of the invention will hereinafter become more fully apparent from the following description of the drawings illustrating presently preferred embodiments thereof, and wherein.

Figure 2:
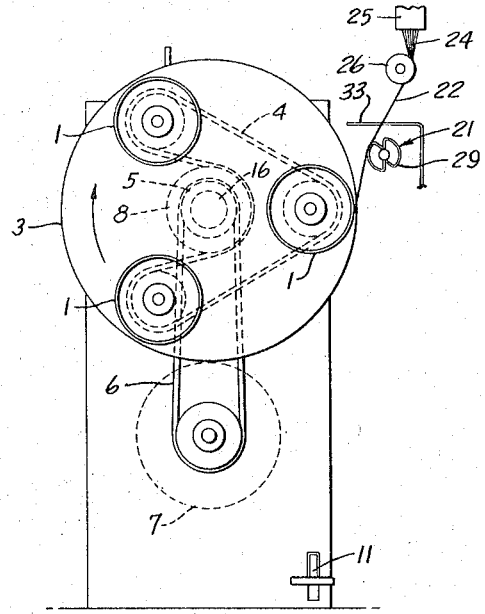
FIG. 2 is a front elevation of the winding apparatus of the invention.
Figure 1:
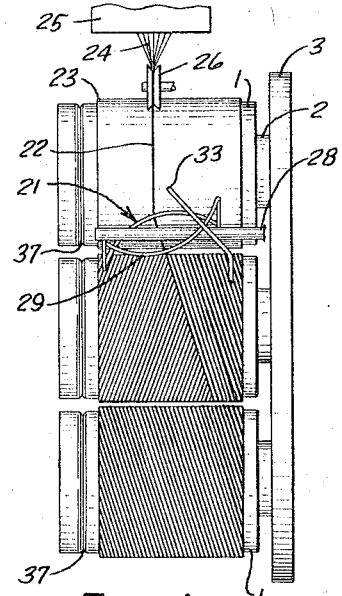
FIGURE 1 is a side elevation of the winding apparatus of the invention with some parts broken away.

The winding apparatus shown in FIGURES 1 and 2 consists of a series of drums 1 which are mounted for rotation on shafts 2. The shafts 2 are journaled in a turntable 3, and the drums 1 are disposed radially in spaced relation with respect to each other on the turntable 3.

The drums are rotatably driven in a clockwise direction by a V-belt 4 which contacts a hub 5 provided on each drum shaft 2. This may best be seen in FIG. 2. A second belt 6 which is driven by motor 7 acts to drive hub 8. As hub 8 is rotated by belt 6, it acts to drive V-belt 4 which is maintained in frictional engagement with an end of the hub 8. A common belt drive system, therefore, serves to simultanously rotate each of the drums. The system is generally driven at a speed which will be sufficient to wind about five to six thousand feet of strand onto the drum per minute. However, speeds which will yield ten thousand feet per minute or more may be employed when required.

A foot actuated brake, (not shown), is employed in conjunction with a clutching mechanism of any well-known type (not shown) to stop the rotation of a drum 1 preparatory to the initiation of the continuous winding operation. When an operator depresses foot lever 11 of the brake, the hub 5 is thereby disengaged from driving engagement with shaft 2. The drum upon which the strand is to be initially wound can be stopped in this manner independently of the uniform rotation of the others. A hand brake of any well-known type may be provided to halt the drums separately.

The turntable 3 and drums 1 are rotated by a shaft (not shown) which rotates the turntable in a clockwise direction in a well-known manner, for example, such as is shown in U.S. Patent 3,090,570. As there described, a motor is provided to rotate the turntable one-third of a revolution at predetermined intervals. The intervals are determined according to the quantity of strand which is desired to be wound upon a drum in a given time. When the predetermined winding time has elapsed, the motor acts to turn the shaft (not shown) and turntable 3 thereby placing an empty drum in the primary winding position. The details of the turntable indexing system form no part of the present invention.

It is the general practice in the manufacture of glass strand from multiple end glass filaments, which may be drawn from a multi-orifice bushing and gathered prior to winding, to employ in conjunction with a strand winding apparatus, a device to traverse the strand upon the package as it is being wound. As may be seen in FIGURES 1 and 2, a traversing mechanism, generally designated 21 and similar to that shown in the U.S. Patent to G. Beach, 2,391,870, is employed to traverse strand 22 upon a cardboard sleeve 23 which is slipped over the empty drum prior to winding to simplify the removal of the strand package from the drum when filled. The traversing mechanism 21 is generally located between the source of strand supply and the drum upon which the strand is to be wound and is located in parallel alignment with this drum. The traversing mechanism is so disposed that strand 22 is maintained in continuous contact with it during the winding operation. Strand 22, in this instance, is composed of a plurality of filaments 24 which are drawn from a multi-orifice bushing 25 and are gathered together beneath the bushing by a graphite wheel 26 to form the strand.

It has been found to be necessary to wind the strand 22 upon sleeve 23 in helices, as opposed to the application of successive turns of strand upon the sleeve in side-by-side relation as is commonly employed in the yarn industry. Two factors are responsible for this requirement. First, the strand is formed of rather loosely gathered filaments. If the strand is wound in side-by-side relation, some of the filaments of one turn will tend to become intermeshed and entangled with some of the filaments of an adjoining turn. When a sleeve filled in this manner is unwound, the entangled filaments break and the strand develops a substantial degree of fraying. The breakage often becomes of sufficient magnitude to prevent complete unwinding of the strand package. Second, glass strands are often impregnated with a sizing agent before being wound into a package. Due to the high speed of the winding operation, the sizing agent generally does not have sufficient time to dry before the strand is wound. When the sized strand is wound in side-by-side relation, it is sufficiently tacky or sticky to cause successive turns of strand to adhere to each other. As in the case of entangled filaments, breakage often results due to adherence and much of a strand package may be wasted.

Traversing mechanism 21 includes a shaft 28 rotatably driven in a counterclockwise direction by a motor (not shown), and a pair of strand engaging complementary cam members 29 of a generally spiral configuration mounted upon the shaft 28 which connects with the motor (not shown). The traversing mechanism 21 is reciprocated by a suitable cam means of conventional construction such as that shown in Cunningham, 3,090,570. The details of construction of the traverse mechanism form no part of the present invention. Reciprocating motion is imparted to the traversing mechanism 21 in the manner shown by Cunningham 3,090,570, and strand 22, guided by cams 29, is carried to the drum 1 in the primary winding position in helices which do not permit side-by-side contact of successive strand turns.

Simultaneously with the shifting of the drums, a conventional timing device master controller or programmer, interrupts the reciprocation of the traverse mechanism 21. The conventional control circuit for producing the timed motion sequences of turntable 3 may be of the type shown in FIG. 9 of Cunningham 3,090,570. The details of construction of the control circuit form no part of the present invention. A lever arm 33 is disposed to engage strand 22 at this instant and move it into alignment with the outer ends of the adjacent drums 1 in a manner such as shown in Cunningham 3,090,570. The arm 33 is actuated by a motor means (not shown) separate from that which rotates the traverse mechanism 21. This operation is timed to occur when traverse mechanism 21 has ceased reciprocating and as turntable 3 is changing position to accomplish transfer of the strand 22 between drums 1. The upper end of arm 33 engages strand 22, which is still being wound at normal winding speed upon the filled drum, and deflects the strand in a generally outward direction with respect to the drums and outwardly of the sleeve 23. The arm 33 carries the strand 22 beyond the outer limit of cams 29 and into alignment with a groove 37 provided adjacent sleeve 23 and near the outermost end of the drum to which the strand 22 is to be transferred.

The deflection of strand 22 occurs as the filled drum is being rotated clockwise out of the primary winding position and an empty drum is being shifted into its position. When the empty drum approaches the normal winding position, the strand which is aligned with groove 37 by arm 33 is brought into contact with the surfaces bordering the groove and is caught or gripped thereby. At the instant the strand 22 is caught or gripped by the surfaces bordering the groove, sufficient tension is developed to break the strand between the filled drum and the empty drum. A number of turns of strand are laid into the groove to assure secure attachment to the empty drum. The timing mechanism, master controller or programmer actuates the means (not shown) to move arm 33 out of contact with strand 22 by means of an independent actuating means (not shown). Arm 33 is finally completely carried out of contact with the strand 22. When the tension of arm 33 on strand 22 is released, the strand tends to assume a position vertically beneath wheel 26, thereby shifting axially inwardly from the groove 37 and into alignment with the sleeve 23. Rotation of the traverse mechanism 21 with respect to the sleeve as cams 29 engage strand 22 is then resumed, thereby winding the strand 22 in helices onto the sleeve 23.

The transfer of strand 22 from one drum to another is a carefully timed and co-ordinated operation. It is accomplished substantially without interruption of the winding or drawing process. Filaments are drawn from the bushing 25 at a uniform speed and tension, and the winding drums continue to revolve at the optimum winding speed during the strand transfer operation.

To initiate the winding operation, lever 11 of the foot brake is depressed; and through the action of the intermediate clutch system (not shown), the drum 1 in the primary winding position is brought to a halt while the remaining drums rotate at optimum winding speeds. The operator grasps a segment of strand 22 as it is delivered from bushing 25 and introduces the strand in groove 37 of drum 1. He gradually releases foot brake 11 allowing a number of turns of the strand to accumulate in groove 37 to insure secure attachment to the drum. The foot brake is then fully released permitting the drum to rotate at optimum winding speed. Strand 22 is allowed to resume its normal delivery path from bushing 25 and thereby falls into traversing contact with cams 29 of the traverse mechanism and is wound upon sleeve 23 adjacent groove 37. The strand is wound upon the sleeve of the drum until a predetermined amount has accumulated upon the drum whereupon an automatic strand transfer sequence is initiated. Due to the lack of uniformity in filament diameter which results from the manual attachment of the strand to the drum and from the relatively gradual increase in speed of the drum to which the strand is initially attached, an automatic transfer cycle may be initiated as soon as the strand has been securely attached to the initial drum to transfer it to a second drum at a uniform speed. The strand accumulated upon the initial drum may be discarded.

A hand brake (not shown) may be utilized to permit removal of a filament or strand package from a drum which has been filled. When the desired amount of filament or strand has been wound upon a drum and the transfer sequence has been completed, the filled drum may be halted independently of the action of the remaining drums by the hand brake. The sleeve 23 upon which the strand or filament has been wound may then be removed. A new sleeve may then be slipped over the drum and the brake released and the hub 5 again acts to drive shaft 2 at normal winding speed. This arrangement, therefore, permits the unloading of filled drums and the replacement of sleeves without interruption in the high speed winding operation.

Figure 3:
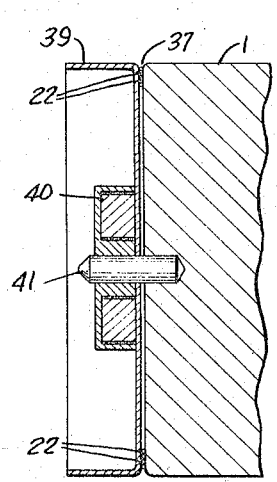
FIG. 3 is a partial axial sectional view of a winding drum.

FIG. 3 shows a sectional view of the transfer end of drum 1. The strand catching or gripping groove 37, in this instance, is provided by magnetically attaching a dished plate 39 to the axially outermost end of drum 1. Plate 39, carrying a permanent magnet 40, is slipped over a centering pin 41 which is connected to the drum end. Utilizing the plate and magnet, as shown, the strand accumulation in groove 37 can be readily removed with removal of a strand package and replacement of sleeve 23.

Figure 4:
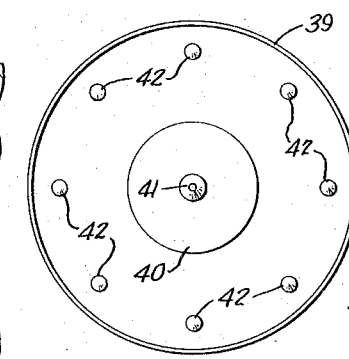
FIG. 4 is an end view of another embodiment of a winding drum.
Figure 5:
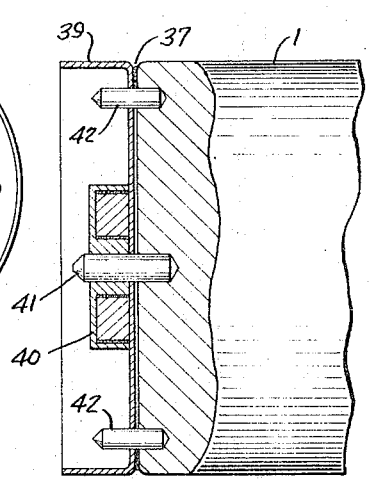
FIG. 5 is a partial axial sectional view of the embodiment shown in FIG. 4.

In instances where dished plate 39 is likely to receive rough handling or the magnet 40 attached thereto is likely to come into contact with magnetic particles, the construction shown in FIGS. 4 and 5 may be employed. When the surface of plate 39 becomes damaged from handling or carries magnetic particles when brought into contact with the end surface of drum 1, it has been found that the plate will not come into uniform surface-to-surface contact with the end of the drum. If a substantially uniform surface contact cannot be obtained, the strand, when caught by the groove 37, tends to fall between the surfaces defining the groove in irregular or elliptical loops. As a result, some portions of the strand lay nearer the center of the groove than others. The portions near the center of the groove travel more slowly than those near the outer end of the groove. An unequal tension develops, and the strand frequently breaks under these circumstances thereby causing an automatic strand transferring failure. To remedy this, a series of pins 42 may be attached to drum 1 in axially spaced circular relation. Plate 39 is provided with perforations complementing the pin configuration on the drum to permit installation of the magnet bearing plate 39.

In the arrangement shown in FIGS. 4 and 5, the strand which is caught within groove 37 will fall into the generally circular pattern defined by the spaced pins 42. The strand will thereby be prevented from forming an irregular or elliptical pattern within the groove 37 and breakage due to uneven tension exerted by unequal winding speeds can be avoided. In addition, the series of spaced pins 42 acts to prevent any relative rotation or slippage of plate 39 with respect to drum 1 during the strand transferring operation.

Figure 6:
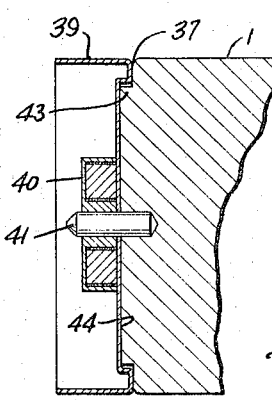
FIG. 6 is a partial axial sectional view of another embodiment of a winding drum.

A modified version of the strand catching apparatus of FIGS. 4 and 5 is shown in FIG. 6. The end of drum 1 in this embodiment is formed with a generally annular projection 43. Complementing this, dished plate 39 is formed with an annular cavity 44. When plate 39 is attached to drum 1, the portion of the plate bordering the cavity 44 overlaps projection 43. As is the case with the embodiment shown in FIGS. 4 and 5, strand 22 is prevented from falling between the surfaces defining groove 37 in an irregular of elliptical pattern and thereby becoming subject to frequent breakage. By maintaining a substantially circular strand pattern within the groove 37 breakage may be all but eliminated.

Figure 7:
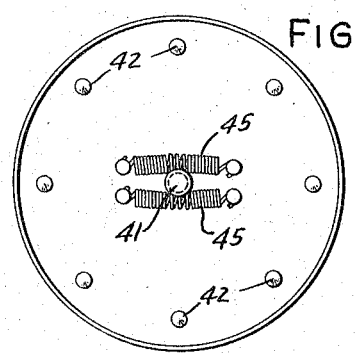
FIG. 7 is an end view of another embodiment of a winding drum.

An alternative means for holding plate 37 in contact with the outer end surface of drum 1 is shown in FIG. 7. A pair of gripping springs 45 are secured to the axially outermost surface of plate 39. The springs 45 act to grip the peripheral surface of centering pin 41. To promote positive gripping, pin 41 may be provided with a circumferential groove 46 into which springs 45 may fall when the pin is pushed into the plate.

Various modes of carrying out the invention are contemplated as being within the scope of the following claims particularly pointing out and distinctly claiming the subject matter which is regarded as the invention.

I claim:

1. A winding apparatus comprising a drum, a plate disposed at an end of the drum, the surface of the plate adjacent the drum and the end surface of the drum providing a slot between the plate and the drum adapted to engage and retain a portion of a strand being delivered from a source of supply, means for removably securing the plate adjacent an end of the drum and means for guiding a portion of the strand being delivered from the source of supply into engaging contact with the slot provided by the surfaces of the plate and drum whereby the strand may be retained by the slot may be subsequently wound upon the drum.

2. A winding apparatus comprising a drum, a plate disposed at an end of the drum, the surface of the plate adjacent the drum and the end surface of the drum providing a slot between the plate and the drum adapted to engage and retain a portion of a strand being delivered from a source of supply, magnetic means for removably securing the plate adjacent an end of the drum and means for guiding a portion of the strand being delivered from the source of supply into engaging contact with the slot provided by the surfaces of the plate and drum whereby the strand may be retained by the slot and may be subsequently wound upon the drum.

3. A winding apparatus comprising a drum, a plate disposed at an end of the drum, the surface of the plate adjacent the drum and the end surface of the drum providing a slot between the plate and the drum adapted to engage and retain a portion of a strand being delivered from a source of supply, resilient gripping means for removably securing the plate adjacent an end of the drum and means for guiding a portion of the strand being delivered from the source of supply into engaging contact with the slot provided by the surfaces of the plate and drum whereby the strand may be retained by the slot and may be subsequently wound upon the drum.

4. A winding apparatus comprising a drum, a plate disposed at an end of the drum, the surface of the plate adjacent the drum and the end surface of the drum providing a slot between the plate and the drum adapted to engage and retain a portion of a strand being delivered from a source of supply, means for removably securing the plate adjacent an end of the drum, radially spaced means disposed between the plate and the drum and within the slot provided by the surfaces thereof to restrict the radial depth of entry of the strand into the slot while maintaining a uniform circumferential winding of the strand within the slot and means for guiding a portion of the strand being delivered from the source of supply into engaging contact with the slot provided by the surfaces of the plate and drum whereby the strand may be retained by the slot and may be subsequently wound upon the drum.

5. A winding apparatus comprising a drum, a plate disposed at an end of the drum, the surface of the plate adjacent the drum and the end surface of the drum providing a slot between the plate and the drum adapted to engage and retain a portion of a strand being delivered from a source of supply, means for removably securing the plate adjacent an end of the drum, means for preventing the relative rotation of the plate with respect to the drum and means for guiding a portion of the strand being delivered from the source of supply into engaging contact with the slot provided by the surfaces of the plate and drum whereby the strand may be retained by the slot and may be subsequently wound upon the drum.

References Cited by the Examiner

UNITED STATES PATENTS 2,772,054  11/1956  Herele et al. _____ 242—18
3,090,570  5/1963   Cunningham et al. ____ 242—18

STANLEY N. GILREATH, *Primary Examiner.*